2,771,474

PROCESS FOR THE PRODUCTION OF 6-KETO-17α-METHYLTESTOSTERONE

Herbert C. Murray, Hickory Corners, and Durey H. Peterson, Kalamazoo, Mich., assignors to The Upjohn Company, Kalamazoo, Mich., a corporation of Michigan No Drawing. Application July 16, 1953,
Serial No. 368,521

1 Claim. (Cl. 260—397.4)

The present invention relates to steroid compounds, and is more particularly concerned with the novel 6-keto-17α-methyltestosterone and with a process for the production thereof.

The novel compound of the present application, which is a continuation-in-part of application Serial Number 297,242, filed July 5, 1952, which is a continuation-in-part of application Serial Number 272,944, filed February 23, 1952, now Patent 2,602,769, issued July 8, 1952 and application Serial Number 180,496, filed August 19, 1950, now abandoned, may be represented by the following structural formula:

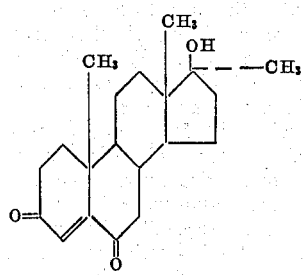

and may be prepared by the selective oxidation of the 6β-hydroxy group of 6β-hydroxy-17α-methyltestosterone to a 6-keto group with an oxidizing agent such as chromic acid, e. g., at least about two equivalents of chromic acid.

It is an object of this invention to provide 6-keto-17α-methyltestosterone and a convenient method for its production from readily available 6β-hydroxy-17α-methyltestosterone. Other objects will be apparent to those skilled in the art to which this invention pertains.

The novel compound of this invention, 6-keto-17α-methyltestosterone, is not only a pharmacologically and physiologically active compound possessing essentially protein anabolic, adrenocorticotropic hormonal and anesthetic properties, but is also a valuable intermediate for the synthesis of other steroids. For example, dehydration of 6-keto-17α-methyltestosterone with phosphorus oxychloride and ozonization of the thus-obtained 6-keto-17-methylene-4-androstene-3,6-dione yields 4-androstene-3,6,17-trione [Butenandt, Ber. 69, 1163 (1936)] which possesses estrogenic activity.

The starting material of the present invention is 6β-hydroxy-17α-methyltestosterone which may be prepared by biooxidation of 17α-methyltestosterone with the aid of a mold of the Rhizopus nigricans strain as shown in Preparation 1.

In carrying out the process of the present invention, 6β-hydroxy-17α-methyltestosterone, dissolved in an organic solvent such as acetic acid, benzene, toluene, petroleum ether, hexanes (Skellysolve B), dioxane or similar solvents or mixtures thereof, with acetic acid and benzene being preferred, is oxidized with a solution containing chromic acid. The chromic acid may be added as chromic acid anhydride together with a small, but sufficient amount of water to produce the dichromate ion ($Cr_2O_7{-}{-}$), or may be produced in situ by reaction between an alkali-metal dichromate such as sodium or potassium dichromate and an acid, for example, acetic acid, formic acid, or sulfuric acid. The reaction may be carried out in a heterogeneous or a homogeneous system. If the reaction is carried out in a heterogeneous system, 6β-hydroxy-17α-methyltestosterone, dissolved in an organic solvent which is inert to oxidation under the reaction conditions, such as benzene, chlorobenzene, bromobenzene, hexane, chloroform, halogenated hydrocarbons, ethyl acetate, or a similar solvent, is admixed with a solution of aqueous sodium dichromate or potassium dichromate acidified with sulfuric acid, or sulfuric acid combined with acetic acid. Vigorous agitation is then employed to bring the organic layer into intimate contact with the aqueous solution. The reaction time is mainly dependent on efficient stirring. In the preferred embodiment of the invention, the oxidation is carried out in homogeneous solution, with acetic acid and benzene as solvent and chromic acid as oxidizing agent, the chromic acid being produced by the reaction of alkali dichromate with acetic acid or by small amounts of water with chromic anhydride. At the termination of the reaction, excess of chromic acid may be destroyed by adding methyl or ethyl alcohol to the solution and concentrating the solution on a steam bath in vacuo. The temperature of the reaction is maintained between about zero and about fifty degrees centigrade, with temperatures between about fifteen and thirty degrees centigrade preferred. The reaction time depends on the temperature and may vary between about one hour to about 24 hours or even longer. The thus-obtained 6-keto-17α-methyltestosterone is isolated from the reaction mixture by extraction with organic solvents, for example, ether, ethyl acetate, chloroform, methylene dichloride or water-immiscible alcohols and purified by conventional means, such as recrystallization and chromatography.

The following examples are illustrative of the process and product of the present invention, but are not to be construed as limiting.

PREPARATION 1.—6β-HYDROXY-17α-METHYLTESTOSTERONE

A medium was prepared of twenty grams of Edamine enzymatic digest of lactalbumin, three grams of corn steep liquor and fifty grams of technical dextrose diluted to one liter with water and adjusted to a pH of 4.3 to 4.5. Twelve liters of this sterilized medium was inoculated with Rhizopus nigricans minus strain, American Type Culture Collection Number 6227b, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller [Ind. Eng. Chem. 36, 504 (1944)]. To this medium containing a 24-hour growth of Rhizopus nigricans minus strain was added six grams 17α-methyltestosterone in 120 milliliters of absolute ethanol to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium and extacted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The extractives obtained upon evaporation of the methylene chloride solvent were taken up in benzene to leave a residue of benzene insoluble crystals. These were washed with additional benzene to give 550 milligrams of white crystals. Recrystallization from a mixture of equal parts of ethyl acetate and acetone gave 500 milligrams of crystals melting at 220 to 235 degrees centigrade. These were redissolved in three milliliters of methanol and ether was added to reprecipitate the crystals. The resulting crystals of 6β-hydroxy-17α-methyltestosterone weighed 212 milligrams and had a melting point of 247 to 252 degrees centigrade. Infrared and ultraviolet spectra verified the structure.

*Example 1.—6-keto-17α-methyltestosterone*

A solution of fifty milligrams of 6β-hydroxy-17α-methyltestosterone, dissolved in one milliliter of acetic acid, was admixed at zero degrees centigrade with a solution of 15.7 milligrams of chromium trioxide in a mixture of four milliliters of glacial acetic acid and 0.02 milliliter of water. The reaction mixture was kept at room temperature, about twenty to 25 degrees centigrade, for a period of sixteen hours. At the completion of this period, ten drops of methanol and 45 milliliters of water were added and, after standing for ten minutes at room temperature, the mixture was extracted with three fifteen-milliliter portions of methylene dichloride. The combined extracts were washed with the following ten-milliliter portions: four times with saturated sodium bicarbonate solution and two times with water. The ether-methylene dichloride extracts were then dried over anhydrous sodium sulfate and evaporated to give 62 milligrams of solids. These solids were dissolved in six milliliters of benzene and chromatographed over a column containing three grams of alumina previously activated by treatment with acids and drying at 120 degrees centigrade. The column was developed with six-milliliter volumes of solvents as follows:

*Table 1*

| Fraction | Solvent | Eluate Solids, Milligrams |
|---|---|---|
| 1 | benzene | |
| 2 | do | |
| 3 | benzene-ether 19 : 1 | |
| 4 | do | |
| 5 | benzene-ether 9 : 1 | |
| 6 | do | |
| 7 | benzene-ether 1 : 1 | |
| 8 | do | |
| 9 | do | |
| 10 | do | |
| 11 | ether | |
| 12 | do | |
| 13 | do | |
| 14 | do | |
| 15 | do | |
| 16 | ether-chloroform 19 : 1 | |
| 17 | do | |
| 18 | ether-chloroform 9 : 1 | |
| 19 | do | |
| 20 | ether-chlorogorm 1 : 1 | 8.6 |
| 21 | do | 5.7 |
| 22 | chloroform | 6.9 |
| 23 | do | 4.3 |
| 24 | chloroform-acetone 19 : 1 | |
| 25 | do | |
| 26 | chloroform-acetone 9 : 1 | |
| 27 | do | |
| 28 | chloroform-acetone 1 : 1 | |
| 29 | do | |
| 30 | acetone | |
| 31-34 | methanol | |

Fractions 21 and 22, having a combined weight of 12.6 milligrams, were found to be 6-keto-17α-methyltestosterone. Infrared analysis confirmed the structure of the product as 6-keto-17α-methyltestosterone.

*Example 2.—6-keto-17α-methyltestosterone*

A solution of 6β-hydroxy-17α-methyltestosterone in benzene was agitated for twelve hours with an aqueous solution of sodium dichromate and dilute sulfuric acid at room temperatures. The benzene layer was separated from the aqueous solution, washed, dried over anhydrous sodium sulfate and evaporated to yield 6-keto-17α-methyltestosterone which was purified by chromatography as shown in Example 1.

*Example 3.—6-keto-17α-methyltestosterone*

A solution of 100 milligrams of 6β-hydroxy-17α-methyltestosterone in a mixture of two milliliters of benzene and one milliliter of glacial acetic acid was admixed at zero degrees centigrade with a solution of sixty milligrams of sodium dichromate in a mixture of 0.7 milliliter of glacial acetic acid and 0.2 milliliter of benzene. The solution was vigorously stirred for a period of six hours, while kept in an ice-bath. At the completion of this period, 35 milliliters of water was added and the mixture was extracted with three twenty-milliliter portions of a solvent mixture consisting of ether-methylene dichloride in a one to one ratio. The combined extracts were washed with the following ten-milliliter portions: three times with three percent hydrochloric acid solution, twice with water, twice with four percent potassium hydroxide, and twice with water. The ether-methylene dichloride extracts were then dried over anhydrous sodium sulfate, evaporated and the solids were chromatographed as shown in Example 1 and recrystallized from acetone and methanol to give 6-keto-17α-methyltestosterone.

It is to be understood that the invention is not to be limited to the exact details of operation shown and described, as obvious modifications and equivalents will be apparent to one skilled in the art, and the invention is therefore to be limited only by the scope of the appended claim.

We claim:

A process for the production of 6-keto-17α-methyltestosterone which comprises: contacting 6β-hydroxy-17α-methyltestosterone with chromic acid at a temperature between fifteen and thirty degrees centigrade and separating the thus-produced 6-keto-17α-methyltestosterone.

References Cited in the file of this patent

Chem. Abst. 46: cols. 11375–76 (1942), Abstracting an article of Devis in Acta Chim. Belg. 6, 525–632 (1951).